(12) United States Patent
Mote et al.

(10) Patent No.: US 6,405,771 B1
(45) Date of Patent: Jun. 18, 2002

(54) BICYCLE COVER ADAPTED FOR USE WITH A VEHICLE-MOUNTED BICYCLE RACK

(76) Inventors: Randall J Mote, Box 5065, Coeur d'Alene, ID (US) 83814; Phillip R Wilson, P.O. Box 277, Kellog, ID (US) 83837; Debra J McWilliams, P.O. Box 5065, Coeur d'Alene, ID (US) 83814

( * ) Notice: Subject to any disclaimer, the term of this patent is extended or adjusted under 35 U.S.C. 154(b) by 0 days.

(21) Appl. No.: 09/323,712

(22) Filed: Jun. 1, 1999

(51) Int. Cl.[7] .................................................. B62J 17/08
(52) U.S. Cl. ........................ 150/167; 296/78.1; 296/136; 150/167
(58) Field of Search ........................ 340/432; 150/167; 296/78.1, 136, 335; 362/475, 253

(56) References Cited

U.S. PATENT DOCUMENTS

| | | | | |
|---|---|---|---|---|
| 3,886,988 A | * | 6/1975 | Garrett et al. ............... | 150/167 |
| 4,009,744 A | | 3/1977 | Joslyn | |
| 4,027,150 A | * | 5/1977 | Dean ........................... | 362/186 |
| 4,356,831 A | * | 11/1982 | Adams ......................... | 150/167 |
| D268,546 S | * | 4/1983 | Edery .......................... | D12/452 |
| D294,241 S | * | 2/1988 | Dopkowski ................. | D12/452 |
| 4,944,340 A | * | 7/1990 | Tortorich ..................... | 150/167 |
| 4,976,389 A | | 12/1990 | McLellan et al. | |
| 5,052,738 A | * | 10/1991 | Li ................................ | 196/136 |
| 5,282,502 A | * | 2/1994 | Ballard ........................ | 150/167 |
| D361,977 S | * | 9/1995 | Kahler ......................... | D12/452 |
| D369,339 S | | 4/1996 | Alfonso et al. | |
| 5,617,303 A | * | 4/1997 | Izzo, Sr. ....................... | 362/72 |
| 5,662,372 A | * | 9/1997 | Lubkeman ................... | 296/136 |
| D393,445 S | * | 4/1998 | Nicholson ................... | D12/452 |
| 6,040,764 A | * | 3/2000 | Crisci ........................... | 340/432 |
| 6,129,408 A | * | 10/2000 | Schultz et al. .............. | 296/136 |

* cited by examiner

*Primary Examiner*—Lee Young
*Assistant Examiner*—Tri M. Mai
(74) *Attorney, Agent, or Firm*—David S. Thompson

(57) ABSTRACT

A bicycle cover 10 is adapted to cover one or more bicycles supported by a rack mounted on the rear of a vehicle. A preferred version of the bicycle cover provides opposed front and rear panels 20, 30 held together by a zipper 120. A pair of handlebar enclosures 40 are adapted for covering both the generally straight handlebars found on "mountain" bikes as well as the curled handlebars found on "English racer" type bikes. A hanging mesh bag 50 provides storage for the gear associated with serious bicycling. A taillight assembly 60, carried by the cover, compensates for the inability of drivers following the vehicle to see the vehicle's taillights due to the width and size of the cover.

14 Claims, 5 Drawing Sheets

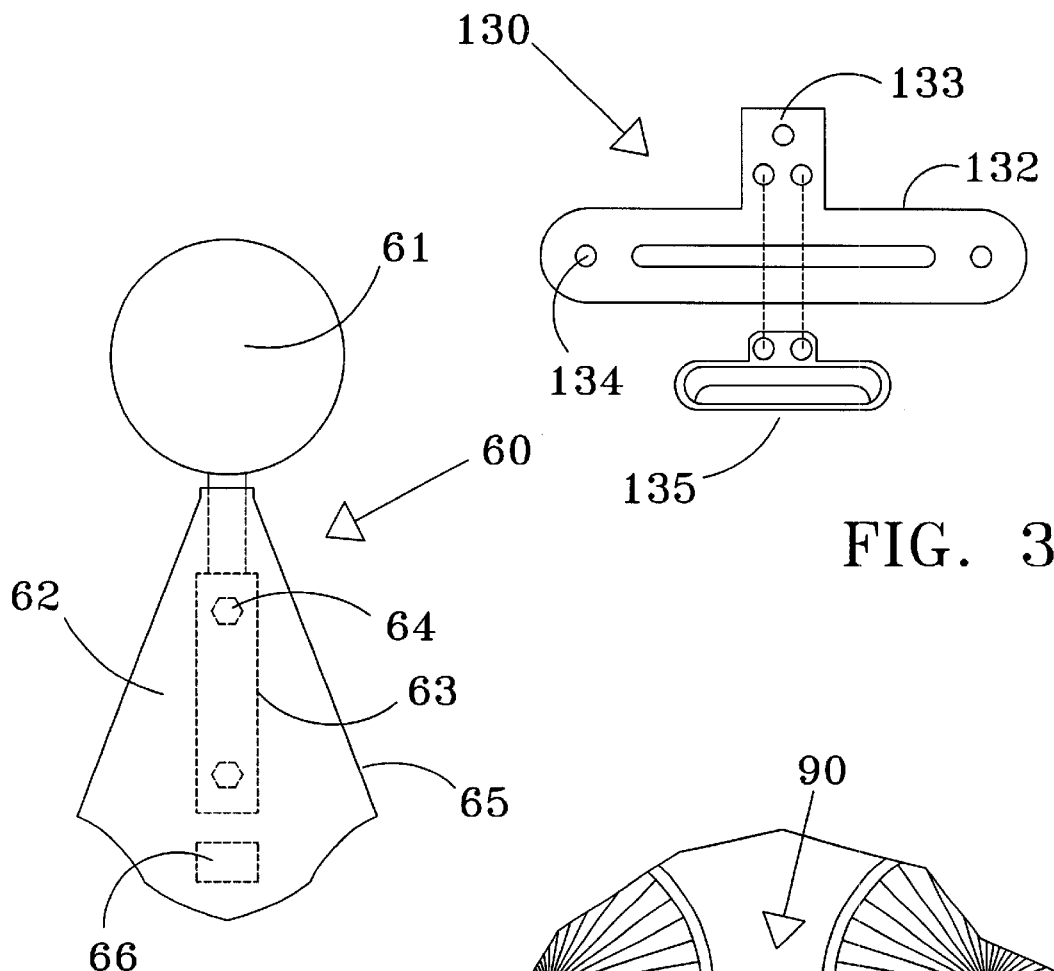

BICYCLE COVER ADAPTED FOR USE WITH A VEHICLE-MOUNTED BICYCLE RACK

CROSS-REFERENCES

There are no applications related to this application filed in this or any foreign country.

BACKGROUND

Bicycle enthusiasts often transport their bicycles to enjoyable locations by using a rack secured to the rear of a car, truck or sport utility vehicle; The bicycle is therefore exposed to the weather, road dirt and wind, hot exhaust, road salt and oil, as well as damage due to movement and collision with the vehicle. Since an ever-increasing number of bicycles are much more expensive than previously, the damage due to corrosion, water damage to leather seats and contamination of chains, sprockets and other components is particularly troubling. Moreover, many of the most enthusiastic bicycle riders have premium bicycles and automobiles, resulting in a greater cost to any damage incurred.

A number of protective enclosures are known; including a limited number of covers designed for use with vehicle-mounted bicycle racks. For example, U.S. Pat. No. 4,009,744 issued to Joslyn discloses a covering which is adapted to cover a bike carried on a rack behind a car. Despite having several characteristics which tend to protect a bicycle being carried, the above-described cover have significant drawbacks when used to protect a bicycle being carried behind a car or truck. Due to the size of the bike, and therefore the size of the cover, the taillights and license plate of the vehicle are totally obscured by the cover. Moreover, known covers fail to provide additional storage space for the gear that is often associated with the sport of cycling. Further, known covers fail to provide distinctly formed handlebar enclosures and seat extension. As a result, these covers tends to be far looser, and during travel tends to flap excessively in the wind, resulting in chafing and rubbing between the bike and the flapping bag. And additionally, known bicycle covers have failed to adapt to the protection of multiple bicycles, which are frequently carried on a single rack.

For the foregoing reasons, there is a need for a bicycle cover adapted for use with a vehicle-mounted bicycle rack that can solve the problem of obscured taillights, that provides a novel means to store additional gear out of the weather and elements, which provides distinctly defined handlebar enclosures, and which is adaptable for use with multiple bicycles.

SUMMARY

The present invention is directed to an apparatus that satisfies the above needs. A novel bicycle cover adapted for use with a vehicle-mounted bicycle rack is disclosed that provides a solution to the problem of obscured taillights, which provides additional storage space for gear and which is adaptable for use with multiple bicycles.

A preferred version of the bicycle cover provides some or all of the following structures.

(A) Front and rear panels, each defining a front tire cover region, a rear tire cover region and a pedal cover region, the panels connected along a lower perimeter.

(B) A hanging storage bag, carried between the front panel and the rear panel.

(C) Two handlebar enclosures, one each carried by the front and rear panels.

(D) A zipper having left and right slides traveling on zipper tracks carried by an upper perimeter of the left and the right panels.

(E) Left and right taillight assemblies, each supported by a bracket passing through holes defined in the front and rear panels.

(H) A reinforcing panel, carried by each of the pedal cover regions of the front and rear covers.

(I) A tire strap, carried within the front and rear panels and between the tires of a bicycle enclosed by the cover, maintains the alignment of tires of the bicycle, thereby maintaining the taillight assemblies in the correct alignment.

(J) A reflector, carried on the outside surface of the rear panel.

(K) Left and right support loops, sewn between the lower perimeter of the front and rear panels, each support loop having an inner loop carried between the front and rear panels and an outer loop hanging from the lower perimeter.

It is therefore a primary advantage of the present invention to provide a novel bicycle cover adapted for use with a vehicle-mounted bicycle support rack which provides an auxiliary taillight assembly, thereby overcoming the drawback of covering the vehicle's taillights.

Another advantage of the present invention is to provide a novel bicycle cover adapted for use with a vehicle-mounted bicycle support rack which provides internal storage areas.

Another advantage of the present invention is to provide a novel bicycle cover adapted for use with a vehicle-mounted bicycle support rack which provides two handlebar enclosures defined in the cover, which allows the front and rear panels of the cover to more tightly conform to the sides of the bike than would otherwise be possible if the sides of the cover were required to billow out to enclose the handlebars.

A still further advantage of the present invention is to provide a novel bicycle cover adapted for use with a vehicle-mounted bicycle support rack that is adapted for use with bike racks having either twin support arms or a single center support arm.

DRAWINGS

These and other features, aspects, and advantages of the present invention will become better understood with regard to the following description, appended claims, and accompanying drawings where:

FIG. 2 is an enlarged view of the taillight assembly.

FIG. 3 is an enlarged view of the license plate lighting assembly.

FIG. 4 is an enlarged view of the tire strap assembly.

DESCRIPTION

Figure 1:
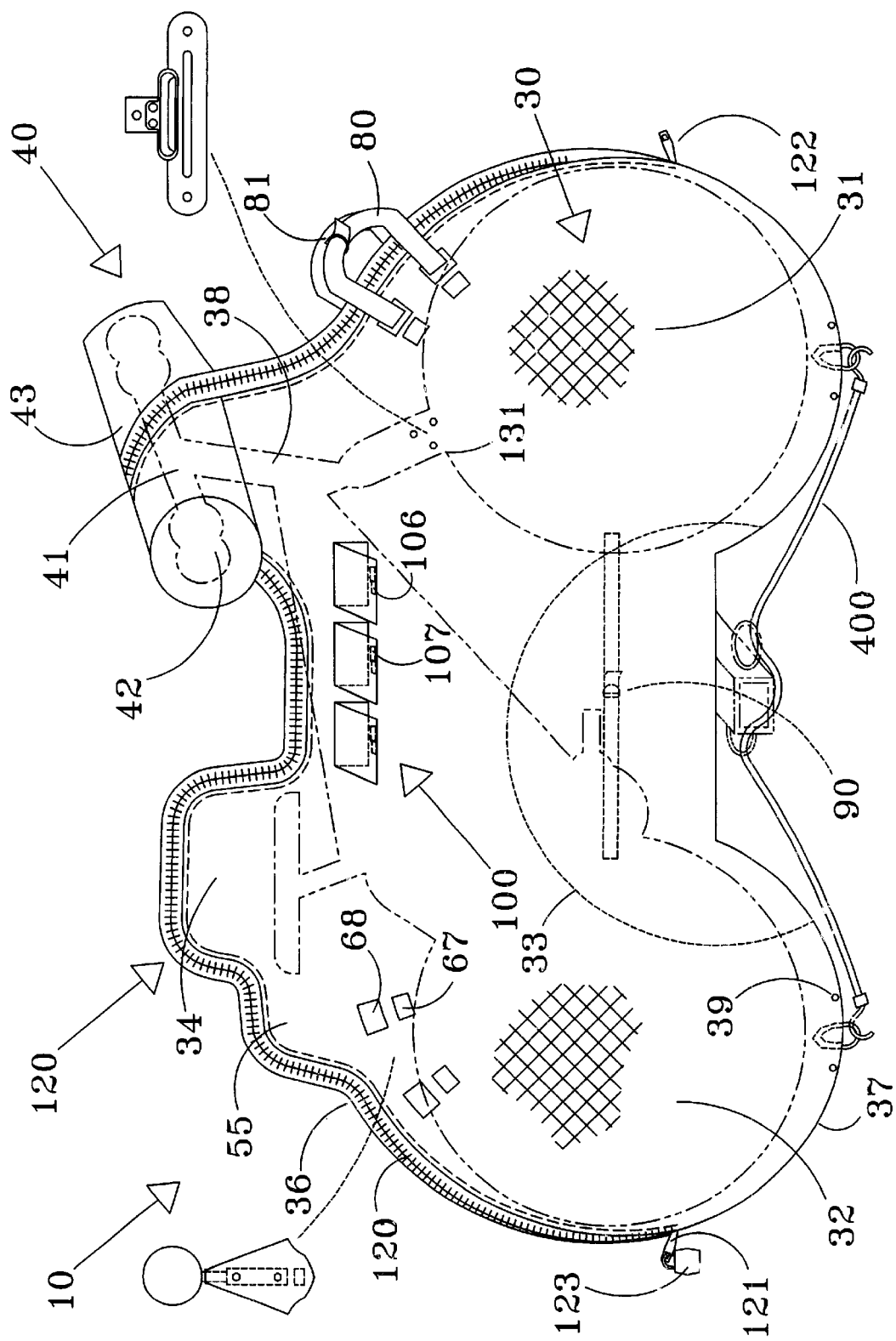
FIG. 1 is a perspective view of a version of the single bike bag.

Referring in generally to FIGS. 1 through 8, two versions of a bicycle cover 10 constructed in accordance with the principles of the invention is seen. The bicycle cover is adapted to cover one or more bicycles supported by a rack mounted on the rear of a vehicle. A preferred version of the bicycle cover provides opposed front and rear panels 20, 30 held together by a zipper 120. A pair of handlebar enclosures 40 are adapted for covering both the generally straight handlebars found on "mountain" bikes as well as the curled handlebars found on "English racer" type bikes. A hanging mesh bag 50 provides storage for the gear associated with serious bicycling. A taillight assembly 60, carried by the cover, compensates for the inability of drivers following the vehicle to see the vehicle's taillights due to the width and size of the cover.

As seen in FIGS. 1. and 5, a preferred version of the bicycle cover 10 provides substantially mirror image front and rear panels 20, 30, the front panel being located next the vehicle during travel, and the rear panel being visible to traffic behind the vehicle. As seen in FIGS. 1 and 2, each panel provides front and rear tire cover regions 31, 32 on either side of a pedal cover region 33. Preferred versions of the tire cover regions are sized to enclose standard 26" or 27" tires, but could be of alternate dimensions for smaller or larger bicycles.

A seat extension region 34 extends upwardly in a location appropriate to enclose the bicycle's seat. A reinforced panel 35 may be added to an upper portion of the seat extension region, to prevent stress in this area from damaging or wearing the cover 10.

A handlebar extension 38 similarly extends upwardly from the body of the cover a short distance. As a result of the seat extension and handlebar extension, the cover is more closely tailored to the shape of the bicycle, and movement and flapping due to air movement is dramatically reduced.

Drain holes 39 are typically defined in a lower portion of either the front or rear panel, or both. Brass grommets prevent the material from fraying, and are corrosion resistant.

Optionally, a bulge 55 may be defined in the panels, allowing for the enclosure of the type of storage rack or bag that is frequently mounted behind the seat of a bicycle.

Figure 5:
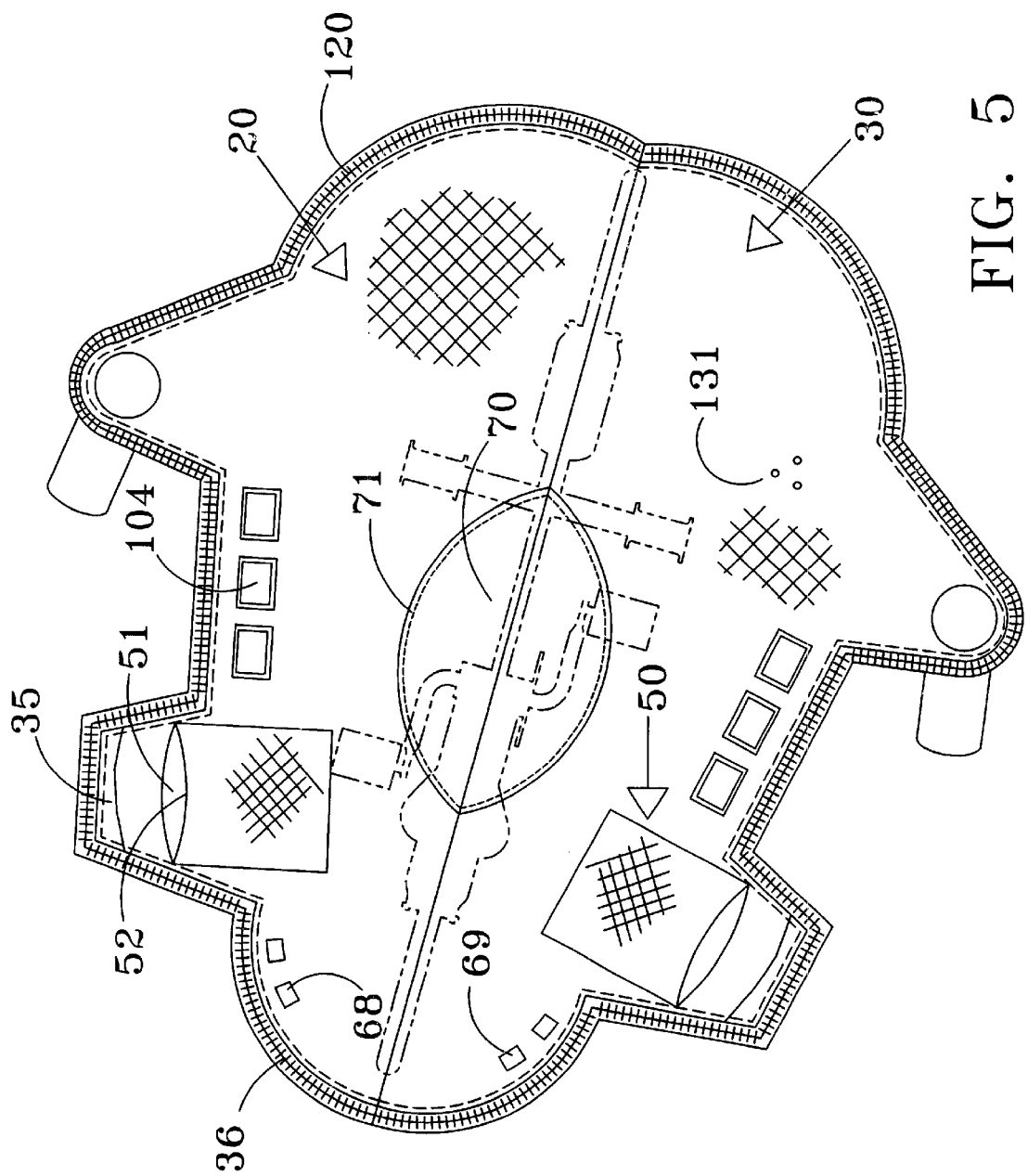
FIG. 5 is a view of the single bike bag of FIG. 1 fully opened.
Figure 6:
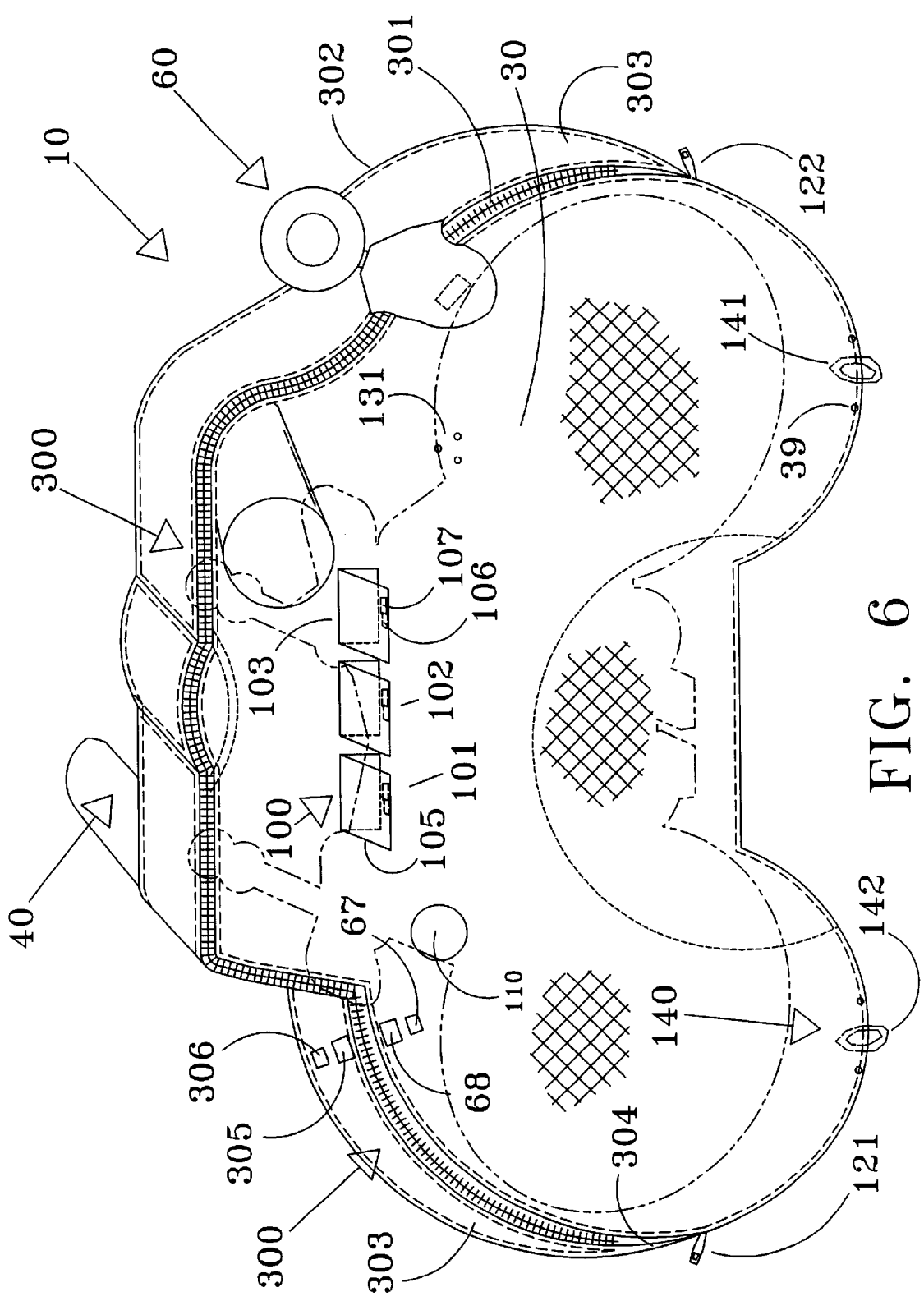
FIG. 6 is a perspective view of a version of the invention adapted for use with multiple bikes.

As seen in FIGS. 1, 5 and 6, a handlebar enclosure 40 is carried by each of the front and rear panels 20, 30. By providing a handlebar enclosure, the distance between the front and rear panels may be minimized. As a result, the cover 10 is less "baggy," and tends to flap less in a windy environment.

The handlebar enclosure is adapted for covering both the generally straight bar type handles found on "mountain" bikes as well as the curled handlebars found on "English racer" type bikes. A preferred handlebar enclosure is made of the same fabric as the front or rear panel to which it is attached. A generally cylindrical body 41 may be somewhat tapered. A first end of the body is attached to the front or rear panel at the base 43. An end piece 42, attached to the second end of the body may be generally circular. Alternatively, in a more economical design, the second end of the body may be sewn closed without an end piece.

The front and rear panels are sewn together along a lower perimeter 37, which generally follows the contour of the lower portion of the front and rear tire covers 31, 32 and the pedal cover region 33.

The front and rear panels are fastened together along an upper perimeter 36 by a zipper 120 having a protective flap or cover. In a typical installation, left and right slides 121, 122 travel on zipper tracks carried by the upper perimeter of each of the panels. A lock 123 may be used to fasten the slides together, thereby locking the cover 10. Alternatively, a zipper with no protective flap, or a length of Velcro® may be used to fastener the panels together.

A preferred version of the cover 10 includes a reinforcing panel 70 attached to an inside surface of both the front and rear panels 20, 30. Such a reinforcing panel prevents the undue wear of the panels 20, 30 due to contact with the pedals, chain and sprockets. The reinforcing panel is made of durable sheet material such as plastic, fabric or coated fabric, and is typically attached by stitching 71, adhesive or other fastening means.

A rack flap assembly 100 includes a plurality of rack flaps, and allows passage through the front and rear panels of the cover by the support arm associated with the bicycle rack carried by the vehicle. It is typically the case that a bicycle rack with have either left and right support arms of a single center support arm. In the circumstance where the rack provides left and right support arms, the left and right rack flaps 101, 102 are used. Where the bicycle rack provides a single support arm, the center rack flap 103 is used.

In a preferred embodiment, each rack flap provides an opening 104 defined through both the front and rear panels 20, 30. A flap 105 sized to cover the opening 104 carries a Velcro® tab 106 or similar hook and loop or other fastening device. A similarly sized Velcro® base 107 is located on the rear panel adjacent to the opening. 104, so that when the flap is closed, the Velcro® fasteners are connected.

One or more reflectors 110 may be attached to the outside surface of the rear panel. Such reflectors may include plastic reflectors, reflective tape or reflective paint.

As seen in FIG. 5, one or more hanging storage bags 50 may be carried within the cover, attached to an inside surface of the front and/or rear panels 20, 30, typically within the seat extension 34. A preferred bag is made of a mesh material, which allows gear stowed within to dry rapidly, and which allows easy visibility of the contents. When the cover 10 is supported from a bicycle rack and is oriented as seen in FIG. 1, an opening 51 is formed on the top edge of the bag. A fastener 52, such as an elastic closure, a Velcro® or similar flap, or a zipper or other fastener, may be used to secure the contents of the storage bag.

Referring particularly to FIGS. 2 and 6, a taillight assembly 60 is seen. The taillight assembly attaches to the vehicle's lighting system through a standard electrical harness used to attach the turn, stop and tail lights of a trailer. Left and right taillight assemblies 60, each supported by a bracket 62 passing through holes 68, 69 defined in the front and rear panels, compensate for the inability of drivers following the vehicle to see the vehicle's. taillights due to the width and size of the cover.

A preferred light unit 61 is of the known type which provides stop, turn and taillight functionality. The light unit 61 is supported by a known type of bracket 62 which can be used to grip the rim and tire of the bicycle. A preferred bracket includes opposed clamping elements 63 which press on opposed sides of the rim and tire. Two bolts 64, a first carried immediately inside the rim and a second carried immediately outside the tire, may be hand-tightened to draw the clamping elements against the rim and tire. As is best seen in FIG. 5, the front and back panels 20, 30 each define a hole 68, 69 through which one of the bolts associated with the bracket 62 may pass. As seen in FIG. 1, two pairs of holes 68, 69 may be defined, thereby allowing installation of the taillight assemblies closer or further from the center-of the vehicle.

A shroud 65 covers the bracket 62 and a portion of the front and rear panels. A preferred shroud is made of the same material as the front and rear panels, and is generally conical in shape. The shroud hides the bracket 62 of each taillight assembly from view, and protects the electrical connections from the elements. Front and back Velcro® tabs 66 or other suitable fastener are carried on diametrically opposed locations on a lower portion of the inside surface of the shroud. Front and back Velcro® bases 67 are carried on an outside portion of the front and back panels, 20, 30 respectively, in locations positioned to mate with the tabs 66.

As seen in FIG. 1, a handle strap 80 may be inserted into the each pair of holes 68, 69. The strap allows. two people to carry a bicycle inside the cover, one carrying each of the handles 80. A preferred strap is made of fabric webbing or similar material, approximately 2 feet long and ¾" to 1½" wide. One end of the strap is passed through each pair of holes, as seen in FIG. 1, and the ends of the strap are joined. Two D-rings 81, or similar fasteners, are sewn into one end, allowing the strap to be formed into an oval of adjustable diameter.

As seen particularly in FIG. 3, in one version of the bicycle cover, a license plate lighting assembly 130 is attachable to the rear panel 30 of the cover 10. The license plate lighting assembly allows a standard license plate to be supported on the rear cover, where it is easily seen by motorists to the rear.

As seen in FIG. 3, three grommet holes 131 and appropriate fasteners in the rear panel 30 support a frame 132 defining three similar holes 133. A lighting unit 135, either attachable to the frame or integral with it, is typically mounted above the license plate, allowing light to shine down and over the surface of the plate. Mounting the lighting unit adjacent to the holes 133 tends to better secure the lighting unit, preventing undesired motion. Holes 134 in the frame, having standard sizing and spacing, allow for attachment of the license plate.

As seen in FIG. 4, a tire strap 90 is carried between the front and rear panels. The tire strap is used to secure the front and rear wheels of the bicycle, thereby preventing both wheels from spinning and preventing the front wheel from turning. A preferred tire strap is made of nylon webbing, approximately three feet long and ¾" to 1½" wide. D-ring 91 connectors allows the tire strap to secure the wheels by passing through each wheel, as seen in FIG. 4.

By keeping the wheels aligned, i.e. by preventing the wheels from spinning and the front wheel from turning, the tire strap causes the wheels to remain in a rigid position. This is essential to hold the taillight assembly 60 in place on each wheel. Without the tire strap 90, there would be a tendency for the light units 61 to fail to point directly rearwardly from the vehicle.

As seen in FIGS. 1 and 6, support loops 140 are attached to the lower perimeter 37 of the cover, and are typically sewn into the connection between the lower perimeter of the front and rear panels. One support loop is carried at each of the low points where the front and rear tire cover regions of the front and rear panels are joined. Each support loop provides an inner loop 141 and an outer loop 142.

As seen in FIGS. 1 and 6, the outer loop 142 hangs below the lower perimeter 37, and is not enclosed by the cover. By attaching the first and second ends of a bungee cord 400 or similar fastening device to the first and second outer loops 142, and by looping a middle portion of the bungee cord 400 about the bumper or trailer hitch receiver tube of the vehicle, the bottom portion of the cover 10 may be secured. In this manner the movement associated with wind and road vibration may be damped, preventing the cover from being unduly shaken.

The inner loop 141 may be used to support the cover 10 when turned inside-out, such as after washing.

As seen in FIG. 6, a multi-bike version of the cover 10 is typically sized for use with two bicycles. The separator panel provides the extra distance between the front and rear panels required to store two or more bicycles. The construction differs slightly from the single bike version, as will be seen. A separator panel 300 separates the front and back panels 20, 30, between the upper perimeter 36 of each panel. A rear edge zipper 301 allows the separator panel to be fastened to the upper perimeter 36 of the rear panel 30 in a re-fastenable manner. A front edge seam 302 is typically permanently sewn to the upper perimeter of the front panel.

A tapered side 303 narrows to a point 304 where the tapered side, front panel 20 and rear panel 30 are joined. The tapered side results in more room inside the upper portion of the cover without proportional increase the lower portion of the cover. This structure tends to urge the lower portion of the bicycle's wheels together. As a result, swinging motion of the bicycles is eliminated. The lower perimeter 37 of the front and rear panels are sewn together, as in the single bike version, seen above.

As seen in FIG. 6, at least one taillight assembly attachment hole 305 is defined in each of the left and right tapered sides 303. The hole 305 allows the taillight assembly 60 to be mounted by passing the fastener through the hole 305 in the tapered side and the hole 69 defined in the rear panel. A Velcro® base 306 allows attachment of the Velcro® tab 66 of the shroud 65.

As seen in FIG. 6, a storage bag 320 may be carried under a middle portion of the separator panel 300. In a preferred embodiment, a lower mesh panel 321 is attached along three sides to the separator panel. A forth side, adjacent to the rear edge zipper 301 defines an opening 322 which may be closed by a fastener 323 such an elastic band, a zipper or several Velcro® tabs. To access the storage bag 320, the rear edge zipper 301 would first be opened sufficiently to expose the opening 322. The fastener 323 could then be opened, allowing access.

Figure 7:
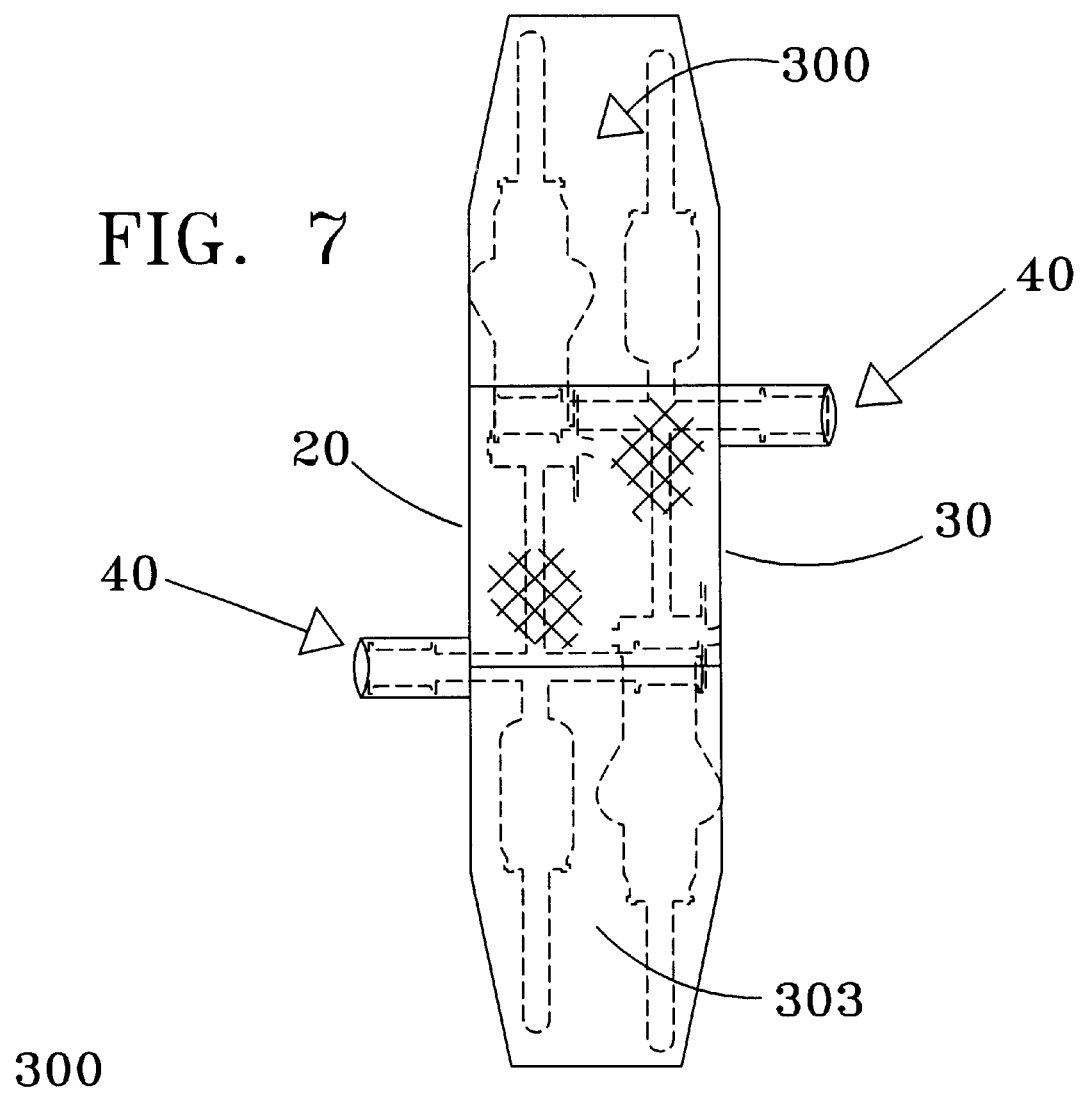
FIG. 7 is a top view of the bike bag of FIG. 6.
Figure 8:
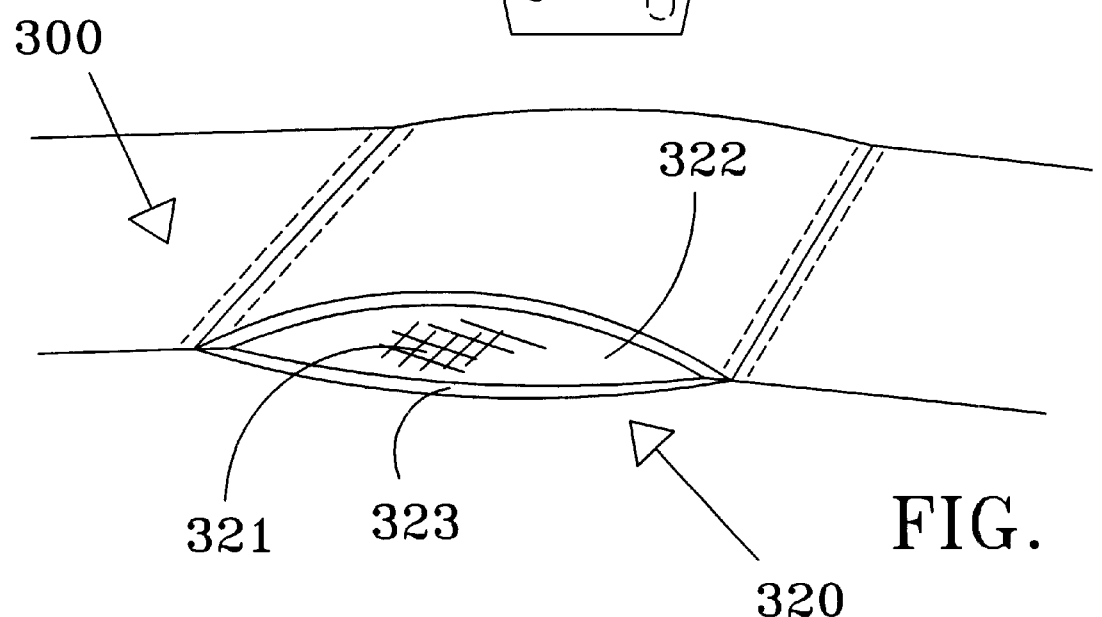
FIG. 8 is an enlarged view of a preferred internal storage bag adapted for use with the multi-bike version of FIG. 6.

As seen in FIGS. 6 and 7, the multi-bike bag is formed by attachment of the front tire cover region of the front panel 20 to the rear tire cover region 32 of the rear panel 30, and the rear tire cover region of the front panel to the front tire cover region 31 of the rear panel. As a result, the handlebar enclosures 40 of the panels 20, 30 are diagonal from each other, rather than opposed. This tends to reduce the interference that would otherwise result if the handlebars of the bicycles were adjacent to one another. The structure seen in FIGS. 6 and 7 allows the separator panel 300 to be narrower, and the bicycles more closely positioned. This tends to result in less motion by the bicycles during travel, and less damage due to contact between them.

The choice of whether to have a left handlebar enclosure on the front panel and a right handlebar enclosure on the rear panel, or the reverse, is entirely arbitrary. However, due to the spare tire configurations on various sport utility vehicles, a number of which-carry the tire on one side or the other, it may be desirable to have the handlebar enclosure on the front panel on one side or the other, and the handlebar enclosure on the rear panel on the opposite side.

The previously described versions of the present invention have many advantages, including a primary advantage of providing a novel bicycle cover adapted for use with a vehicle-mounted bicycle support rack which provides an auxiliary taillight assembly, thereby overcoming the drawback of covering the vehicle's taillights.

Another advantage of the -present invention is to provide a novel bicycle cover adapted for use with a vehicle-mounted bicycle support rack which provides internal storage areas.

Another advantage of the present invention is to provide the novel bicycle cover adapted for use with a vehicle-mounted bicycle support rack which provides two handlebar enclosures defined in the cover, which allows the front and rear panels of the cover to more tightly conform to the sides of the bike than would otherwise be possible if the sides of the cover were required to billow out to enclose the handlebars.

A still further advantage of the present invention is to provide a novel bicycle cover adapted for use with a vehicle-mounted bicycle support rack that is adapted for use with bike racks having either twin support arms or a single center support arm.

Although the present invention has been described in considerable detail and with reference to certain preferred versions, other versions are possible. For example, while a preferred version of the invention is fully equipped with a number of the structures disclosed, alternative versions of the invention could employ a subset of the structures disclosed. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A bicycle cover for carrying a bicycle, the bicycle cover comprising in combination:
   (A) a front panel, defining a front tire cover region, a rear tire cover region, and a pedal cover region;
   (B) a rear panel, defining a front tire cover region, a rear tire cover region and a pedal cover region, the rear panel attached to the front panel along a lower perimeter;
   (C) a hanging storage bag, carried between the front panel and the rear panel;
   (D) a handlebar enclosure, carried by the front panel;
   (E) a handlebar enclosure, carried by the rear panel; and
   (F) left and right support loops, sewn between the lower perimeter of the front and rear panels, each support loop having an inner loop carried between the front and rear panels and an outer loop hanging from the lower perimeter.

2. The bicycle cover of claim 1, further comprising:
   (A) a zipper having left and right slides traveling on zipper tracks carried by the upper perimeter of the left and the right panels.

3. The bicycle cover of claim 2, further comprising:
   (A) left and right taillight assemblies, each supported by a bracket passing through holes defined in the front and rear panels.

4. The bicycler cover of claim 3, further comprising:
   (A) a reinforcing panel, carried by each of the pedal cover regions of the front and rear covers.

5. The bicycle cover of claim 4, further comprising:
   (A) a tire strap, carried between the front and rear panels, for aligning the wheels of the bicycle.

6. The bicycle cover of claim 5, further comprising:
   (A) a reflector, carried on the outside surface of the rear panel.

7. The bicycle cover of claim 6, further comprising:
   (A) a separator panel, carried between the front and rear panels.

8. The bicycle cover of claim 1, further comprising:
   (A) a separator panel, carried between the front and rear panels.

9. The bicycle cover of claim 1, further comprising:
   (A) left and right taillight assemblies, each supported by a bracket passing through holes defined in the front and rear panels.

10. The bicycler cover of claim 1, further comprising:
    (A) a reinforcing panel, carried by each of the pedal cover regions of the front and rear cover.

11. The bicycle cover of claim 1, further comprising:
    (A) tire strap means, carried between the front and rear panels, for aligning the wheels of the bicycle.

12. The bicycle cover of claim 1, further comprising:
    (A) a reflector, carried on the outside surface of the rear panel.

13. A bicycle cover for carrying a bicycle, the bicycle cover comprising:
    (A) a front panel, defining a front tire cover region, a rear tire cover region, and a pedal cover region;
    (B) a rear panel, defining a front tire cover region, a rear tire cover region and a pedal cover region, the rear panel attached to the front panel along a lower perimeter;
    (C) a hanging storage bag, carried between the front panel and the rear panel;
    (D) a handlebar enclosure, carried by the front panel;
    (E) a handlebar enclosure, carried by the rear panel;
    (F) a zipper having left and right slides traveling on zipper tracks carried by the upper perimeter of the left and the right panels;
    (G) left and right taillight assemblies, each supported by a bracket passing through holes defined in the front and rear panels;
    (H) a reinforcing panel, carried by each of the pedal cover regions of the front and rear covers;
    (I) tire strap means, carried between the front and rear panels, for aligning the wheels of the bicycle.
    (J) a reflector, carried on the outside surface of the rear panel; and
    (K) left and right support loops, sewn between the lower perimeter of the front and rear panels, each support loop having an inner loop carried between the front and rear panels and an outer loop hanging from the lower perimeter.

14. The bicycle cover of claim 13, further comprising:
    (A) a separator panel, carried between the front and rear panels.

* * * * *